UNITED STATES PATENT OFFICE.

WILHELM ANTON CASPAR HUNKEMÖLLER, OF AMSTERDAM, NETHERLANDS.

ARTIFICIAL WHALEBONE.

SPECIFICATION forming part of Letters Patent No. 616,465, dated December 27, 1898.

Application filed February 29, 1896. Renewed August 4, 1898. Serial No. 687,754. (No specimens.)

*To all whom it may concern:*

Be it known that I, WILHELM ANTON CASPAR HUNKEMÖLLER, a citizen of the Kingdom of the Netherlands, and a resident of Amsterdam, in the Kingdom of the Netherlands, have invented a new and useful article of manufacture, an Artificial Whalebone, of which the following is a specification.

The object of my invention is to produce a substance which will form a substitute for whalebone, which may be used for all the purposes to which the latter is applied, which may be produced at less cost than the real article, and while it possesses the properties, such as elasticity and homogeneity, it possesses even greater strength and durability than whalebone.

My invention consists, essentially, in treating the sinews and genital organs of oxen, buffalo, horses, and like animals with chlorid of sodium and chrome-alum by any well-known or preferred method of impregnation and in a method to be hereinafter stated.

I am aware that various processes known as "mineral tanning" have been employed for the treatment of skins and hides of animals wherein liquor of alum and chrome-salt have been used in connection with sulfate or protosulfate of iron, soda, magnesia, or chlorid of zinc to effect the tanning process and to convert the skins or hides into leather; but the sinews and genital organs of animals have not been treated heretofore with chrome-alum and chlorid of sodium or their chemical equivalents which unite indissolubly with the muscular portions of the sinews and urinary organs and produce a homogeneous indissoluble substance differing essentially from leather and resembling in its elasticity and toughness the properties of whalebone.

The sinews, preferably the stretched tendons of the feet, (the *tendo Achillis*,) and the genital organs are treated while in a fresh or salted condition (not dried) by first separating the middle or muscular coat of the sinews from the peritoneal covering and also from the internal lining or mucous membrane of the genital organ in a manner similar to that of gut-dressing. The sinews or genital organs thus prepared are then macerated in a liquor composed of an aqueous body which contains ten to twenty per cent. of its weight of the chrome-salts, preferably chrome-alum, and from one-half to one part of chlorid of sodium. The time of treatment varies from four to ten days, depending upon the thickness of the tendons or urethras to be treated and the strength of the solution. The sinews and urethras so treated are then removed from the solution and are dried and pressed between warm plates, whereupon they may be cut into strips ready for use.

While I have found that the best results are attained through the use of chrome-alum, it is obvious that this must be attributed to the chrome contents, and therefore other chrome-salts may be used, if desired.

What I claim as my invention is—

A new article of manufacture comprising the sinews and genital organs of animals impregnated while in a fresh condition with a solution containing chrome-alum and chlorid of sodium in the proportions specified, to produce an imitation whalebone.

In testimony that I claim the foregoing as my invention I have signed my name in the presence of two subscribing witnesses.

WILHELM ANTON CASPAR HUNKEMÖLLER.

Witnesses:
 ALBERTUS KOOPMARZ,
 HENDRIK COERSEN.